(No Model.)

W. F. DILLABY.
Safety-Hook.

No. 227,221.              Patented May 4, 1880.

WITNESSES:
Charles H. Titus
G. M. Carpenter Jr.

INVENTOR.
William F. Dillaby
By his atty Walter B. Vincent

UNITED STATES PATENT OFFICE.

WILLIAM F. DILLABY, OF PROVIDENCE, RHODE ISLAND.

SAFETY-HOOK.

SPECIFICATION forming part of Letters Patent No. 227,221, dated May 4, 1880.

Application filed March 23, 1880. (No model.)

*To all whom it may concern:*

Be it known that I, WILLIAM F. DILLABY, of Providence, in the State of Rhode Island, have made a new and useful Safety-Hook; and I do hereby declare that the following specification, taken in connection with the drawings making a part of the same, is a full, clear, and exact description thereof.

Figure 1:
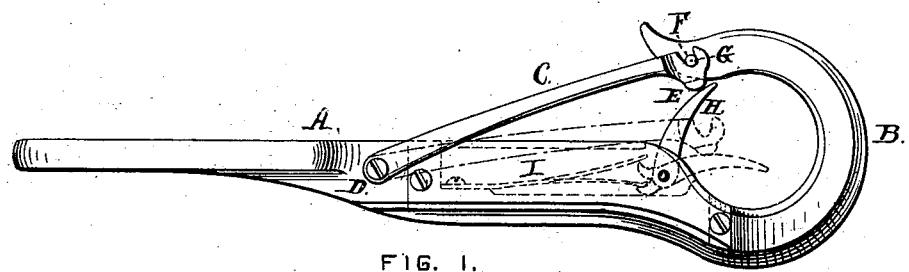
Figure 2:
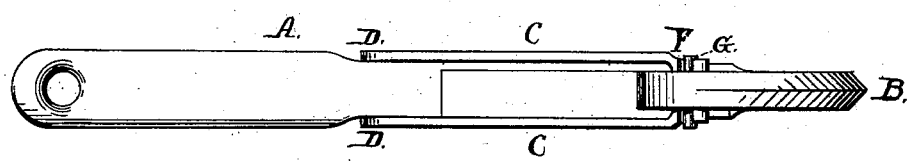

Figure 1 is a side view of the hook. Fig. 2 is a front view.

The object of my invention is to produce a hook which shall be capable of sustaining a greater strain than those now in use, and at the same time be free from any liability to unhook and loose its load; and it consists in the device hereinafter described.

A is the shank, and B the hook. C C are parallel rods pivoted to the shank A at D, connected together at the other extreme by a cross-bar, E, and provided with an open slot, F.

The hook B is provided upon each side with a projecting pin, G.

H is a tongue or lever, which is pivoted to the shank A and extends across and closes the opening of the hook, being held in the required position by an interior spring, I.

Commencing with the several parts in the position shown in Figs. 1 and 2, the operation of my invention is as follows: To adjust the hook I press down the rods C C, which presses the cross-bar E against and forces down the tongue H, overcoming the resistance of the interior spring, I. The parts now occupy the position shown by the dotted lines, Fig. 1, and while so retained the hook is free to be adjusted to any desired object, the same as the ordinary hook in general use. After the hook has been adjusted the pressure is relaxed from the rods C C, which, with the tongue H, are thrown back to their former position through the action of the interior spring, I. The hook is now effectually closed by the tongue H, so that it cannot be accidentally detached or loosened, and the hook itself strengthened by the rods C C, which hook over the pins G and prevent the hook from being straightened or broken by an excessive load.

What I claim as my invention, and desire to secure by Letters Patent, is—

The combination of the shank A, hook B, with its projecting pins G, rods C C, cross-bar E, tongue H, and interior spring, I, the whole constructed and operating together substantially as described.

WILLIAM F. DILLABY.

Witnesses:
  WALTER B. VINCENT,
  E. F. WARNER.